(12) United States Patent
Takai et al.

(10) Patent No.: US 8,238,033 B2
(45) Date of Patent: Aug. 7, 2012

(54) LIQUID LENS DEVICE AND MANUFACTURING METHOD THEREFOR

(75) Inventors: Yuichi Takai, Tokyo (JP); Tetsuyuki Yoshida, Tokyo (JP); Masahiro Shimase, Aichi (JP); Hiroaki Ishiguro, Aichi (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 12/756,336

(22) Filed: Apr. 8, 2010

(65) Prior Publication Data
US 2010/0302646 A1 Dec. 2, 2010

(30) Foreign Application Priority Data
Apr. 16, 2009 (JP) ................................. 2009-100360

(51) Int. Cl.
*G02B 1/06* (2006.01)
(52) U.S. Cl. ........................................................ 359/665
(58) Field of Classification Search ........... 359/665–667
See application file for complete search history.

(56) References Cited

U.S. PATENT DOCUMENTS
7,982,964 B2 * 7/2011 Yoshida et al. ............... 359/665
2009/0021842 A1 * 1/2009 Berge et al. .................... 359/666

FOREIGN PATENT DOCUMENTS
JP 2007-17963 1/2007
JP 2007-225779 9/2007

* cited by examiner

*Primary Examiner* — Darryl J Collins
(74) *Attorney, Agent, or Firm* — K&L Gates LLP

(57) ABSTRACT

A manufacturing method for a liquid lens device includes: preparing a body having a liquid chamber, a conductive first liquid stored in the liquid chamber, an insulating second liquid stored in the liquid chamber, an electrode kept in contact with the first liquid, and a liquid discharge passage for making the communication between the inside and the outside of the liquid chamber; applying pressure to the first and second transparent substrates to thereby compress the sealing member and discharge the first liquid through the liquid discharge passage to the outside of the liquid chamber; and closing the liquid discharge passage.

7 Claims, 9 Drawing Sheets

LIQUID LENS DEVICE AND MANUFACTURING METHOD THEREFOR

CROSS REFERENCES TO RELATED APPLICATIONS

The present application claims priority to Japanese Priority Patent Application JP 2009-100360 filed in the Japan Patent Office on Apr. 16, 2009, the entire content of which is hereby incorporated by reference.

BACKGROUND

The present application relates to a liquid lens device utilizing an electrowetting phenomenon and a manufacturing method for such a liquid lens device.

In recent years, development has been advanced on an optical element utilizing an electrowetting phenomenon. The electrowetting phenomenon is a phenomenon such that when a voltage is applied between an electrode and a conductive liquid opposed to each other with an insulator interposed therebetween, the insulator is charged to cause a change in free energy of the interface between the insulator and the liquid, so that the shape (contact angle) of the surface of the liquid is changed.

Such an optical element can be applied to a variable focus lens, for example (see Japanese Patent Laid-Open No. 2007-225779 (paragraph [0039], FIG. 1), for example). In Japanese Patent Laid-Open No. 2007-225779, there is described an optical element having a lens surface formed by the interface between a conductive first liquid and an insulating second liquid stored in a liquid chamber. The liquid chamber is defined by a transparent substrate, a light transmitting container, and a sealing member interposed between the transparent substrate and the light transmitting container. The transparent substrate has an electrode layer covered with an insulating film. The container is provided with a rod electrode kept in contact with the first liquid. When a voltage is applied between the rod electrode and the electrode layer, an electrowetting phenomenon is exhibited to thereby change the shape of the lens surface.

In manufacturing the optical element as mentioned above, the liquid chamber is sufficiently sealed to avoid the leakage of the liquid. The sealing member is used as a component of the liquid chamber. After the liquid is charged into the liquid chamber, pressure is applied to the liquid chamber so as to compress the sealing member, so that the liquid chamber is sealed by an elastic force of the sealing member.

SUMMARY

However, when the amount of compression of the sealing member is increased to improve the sealed condition of the liquid chamber, the pressure in the liquid chamber may excessively rise to cause damage to the liquid chamber. In contrast, when the pressure to be applied to the liquid chamber is reduced to suppress a rise in pressure in the liquid chamber, the amount of compression of the sealing member may be reduced to cause a problem such that the sealed condition of the liquid chamber becomes insufficient. Thus, sufficiently compressing the sealing member and preventing an excess rise in pressure in the liquid chamber are mutually contradictory and they are difficult to attain at the same time.

It is desirable to provide a manufacturing method for a liquid lens device which can prevent an excess rise in pressure in the liquid chamber in sufficiently compressing the sealing member.

It is still desirable to provide a liquid lens device manufactured by such a method.

In accordance with an embodiment, there is provided a manufacturing method for a liquid lens device including the step of preparing a body having a liquid chamber, a conductive first liquid stored in the liquid chamber, an insulating second liquid stored in the liquid chamber, an electrode kept in contact with the first liquid, and a liquid discharge passage for making the communication between the inside and the outside of the liquid chamber. The liquid chamber is defined by a first transparent substrate on which an electrode layer is formed, a second transparent substrate opposed to the first transparent substrate, and an annular sealing member interposed between the first transparent substrate and the second transparent substrate, the first liquid and the second liquid having different refractive indices and being immiscible with each other. The manufacturing method for the liquid lens device further includes the step of applying pressure to the first and second transparent substrates to thereby compress the sealing member and discharge the first liquid through the liquid discharge passage to the outside of the liquid chamber; and closing the liquid discharge passage.

In the step of applying pressure to the first and second transparent substrates to thereby compress the sealing member, the first liquid stored in the liquid chamber is discharged through the liquid discharge passage to the outside of the liquid chamber. Accordingly, a rise in pressure in the liquid chamber can be suppressed in compressing the sealing member. That is, even when the sealing member is sufficiently compressed, an excess rise in pressure in the liquid chamber can be prevented to thereby prevent damage to the liquid chamber.

Preferably, the step of preparing the body includes the step of mounting a hollow liquid discharge pin for opening the liquid discharge passage between the first transparent substrate and the sealing member; and the step of closing the liquid discharge passage includes the step of removing the liquid discharge pin from the body to elastically restore the sealing member in an embodiment.

When the liquid discharge pin is mounted between the first transparent substrate and the sealing member, the spacing between the first transparent substrate and the sealing member is opened as the liquid discharge passage. Since the liquid discharge pin is hollow, the first liquid is discharged through the liquid discharge pin to the outside of the liquid chamber. Further, when the liquid discharge pin is removed, the sealing member is elastically restored to thereby close the liquid discharge passage.

More preferably, the first transparent substrate has a guide portion formed on a surface opposed to the second transparent substrate so as to surround the outer circumference of the sealing member and a recess formed in the guide portion so as to extend between the outer circumference and the inner circumference of the guide portion; and the step of preparing the body includes the step of mounting the liquid discharge pin in the recess.

In opening the liquid discharge passage by using the liquid discharge pin, the sealing member is locally compressed. When the liquid discharge pin is mounted in the recess of the guide portion, the amount of local compression of the sealing member can be reduced. Accordingly, the sealing member can be properly elastically restored in the closing step, thereby reliably closing the liquid discharge passage.

Preferably, the step of preparing the body includes the step of forming a through hole as the liquid discharge passage in the body; and the step of closing the liquid discharge passage includes the step of plugging an outer end of the through hole located outside of the liquid chamber in the embodiment. In this case, the first liquid is discharged through the through hole as the liquid discharge passage to the outside of the liquid chamber in an embodiment. In the closing step, the outer end of the through hole located outside of the liquid chamber is plugged.

Preferably, the step of preparing the body includes the step of mounting a hollow liquid discharge pin as the liquid discharge passage to the sealing member; and the step of closing the liquid discharge passage includes the step of closing an outer end of the liquid discharge pin located outside of the liquid chamber in an embodiment. In this case, the hollow liquid discharge pin serves as the liquid discharge passage, and the first liquid is discharged through the liquid discharge pin to the outside of the liquid chamber. In the closing step, the outer end of the liquid discharge pin located outside of the liquid chamber is closed.

More preferably, the step of closing the liquid discharge passage includes the step of swaging the outer end of the liquid discharge pin. Swaging is a simple operation, so that an increase in equipment cost can be suppressed in an embodiment.

Preferably, the manufacturing method further includes the step of further applying pressure to the first and second transparent substrates to thereby further compress the sealing member after performing the step of closing the liquid discharge passage in an embodiment.

For example, even when the sealing member is further compressed to adjust the pressure in the liquid chamber after performing the closing step, the first liquid is discharged before the closing step, thereby suppressing an excess rise in pressure in the liquid chamber to reduce the possibility of damage to the liquid chamber.

More preferably, the step of further applying pressure includes the step of fixing the first and second transparent substrates to each other by using a fixing member in an embodiment.

For example, the sealing member may be further compressed by the first and second transparent substrates in fixing the first and second transparent substrates by using the fixing member. Further, in adjusting the pressure in the liquid chamber, the sealing member may be further compressed by the fixing member mounted to the first and second transparent substrates. Thereafter, the first and second transparent substrates may be fixed. Thus, the first and second transparent substrates are fixed by the fixing member to thereby ensure the sealed condition of the liquid chamber.

In accordance with another embodiment, there is provided a liquid lens device including a conductive first liquid; an insulating second liquid having a refractive index different from that of the first liquid; and a body having a sealed liquid chamber defined by a first transparent substrate having a light transmitting area, a second transparent substrate having a light transmitting area opposed to the first transparent substrate, and an annular sealing member interposed between the first transparent substrate and the second transparent substrate, the liquid chamber storing the first liquid and the second liquid immiscible with each other. The liquid lens device further includes a through hole for discharging the first liquid to the outside of the liquid chamber in applying pressure to the first and second transparent substrates to compress the sealing member, the through hole having a first end located inside of the liquid chamber and a second end located outside of the liquid chamber; and closing means for closing the second end of the through hole. The liquid lens device still further includes a first electrode formed on a part of the inner surface of the liquid chamber, the first electrode having a laminated structure composed of a conductor layer and an insulating layer covering the conductor layer; and a second electrode kept in contact with the first liquid in the liquid chamber. When a voltage is applied between the first liquid and the first electrode through the second electrode, the shape of an interface between the first liquid and the second liquid is changed.

In applying pressure to the first and second transparent substrates to thereby compress the sealing member, the first liquid is discharged through the through hole to the outside of the liquid chamber. Accordingly, a rise in pressure in the liquid chamber can be suppressed in compressing the sealing member. In the subsequent closing step, the through hole is closed by the closing means to thereby ensure the sealed condition of the liquid chamber.

According to the present embodiment as described above, an excess rise in pressure in the liquid chamber can be prevented in sufficiently compressing the sealing member.

Additional features and advantages are described herein, and will be apparent from the following Detailed Description and the figures.

DETAILED DESCRIPTION

The present application will be described below with reference to the drawings according to an embodiment.

First Preferred Embodiment

[Configuration of Liquid Lens Device]

Figure 1:
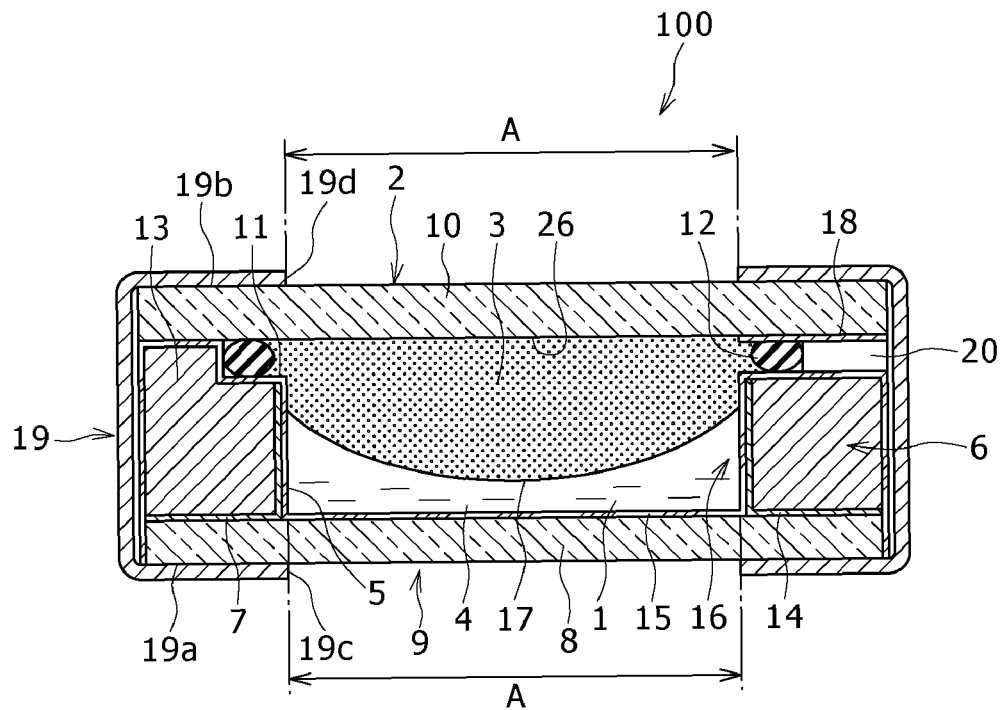
FIG. 1 is a schematic sectional view showing a liquid lens device manufactured by a manufacturing method according to a first preferred embodiment.

FIG. 1 is a schematic sectional view showing a liquid lens device 100 manufactured by a manufacturing method according to a first preferred embodiment of the present invention. The liquid lens device 100 includes a body 2 having a sealed liquid chamber 1, a first liquid 3 stored in the liquid chamber 1, and a second liquid 4 stored in the liquid chamber 1.

The body 2 includes a first transparent substrate 9 composed of a base substrate 6 having a through hole 5 and a light transmitting substrate 8 bonded to one surface 7 of the base substrate 6. The base substrate 6 has another surface 11 opposite to the surface 7, and the through hole 5 extends between the surface 7 and the surface 11 of the base substrate 6.

The surface 11 of the base substrate 6 is formed with a guide portion 13 for mounting a sealing member 12. A second transparent substrate 10 is bonded to the base substrate 6 so that the sealing member 12 mounted on the guide portion 13 is interposed between the base substrate 6 and the second transparent substrate 10. The liquid chamber 1 is defined as a space enclosed by the first transparent substrate 9, the second transparent substrate 10 opposed to the first transparent substrate 9 with the sealing member 12 interposed therebetween, the inner surface of the sealing member 12, and the inner surface of the base substrate 6 forming the through hole 5.

The guide portion 13 is formed with a recess 20. The recess 20 will be hereinafter described in detail in describing the manufacturing method according to this preferred embodiment later.

Each of the light transmitting substrate 8 and the second transparent substrate 10 is formed of a material having high transparency, and has a light transmitting area A as a passage of light entering the liquid lens device 100 or light emerging from the liquid lens device 100. The light passing through the light transmitting area A enters or emerges through the through hole 5 of the base substrate 6.

A conductor layer 14 is formed on the inner surface of the base substrate 6 forming the through hole 5. The conductor layer 14 is connected through a spacing between the base substrate 6 and the light transmitting substrate 8 to a power circuit (not shown). Further, an insulating layer 15 for covering the conductor layer 14 is formed on the first transparent substrate 9. The insulating layer 15 is so formed as to avoid the contact between the conductor layer 14 and the first and second liquids 3 and 4 in the liquid chamber 1. The insulating layer 15 has water repellency, and it is also formed on the upper surface of the light transmitting substrate 8 as the inner surface of the liquid chamber 1. The conductor layer 14 and the insulating layer 15 are laminated on the inner surface of the base substrate 6 forming the through hole 5, and this laminated structure of the conductor layer 14 and the insulating layer 15 forms an electrode layer 16.

Further, another conductor layer 18 is formed on the lower surface 26 of the second transparent substrate 10 as the inner surface of the liquid chamber 1. The conductor layer 18 is also connected to the power circuit. The conductor layer 18 is so formed as to come into contact with the first liquid 3 stored in the liquid chamber 1. The conductor layer 18 corresponds to an electrode according to the present embodiment (which will be hereinafter referred to as the electrode 18).

The first liquid 3 and the second liquid 4 stored in the liquid chamber 1 have different refractive indices (absolute refractive indices) and are immiscible with each other in the liquid chamber 1. The first liquid 3 and the second liquid 4 may have the same specific gravity. The interface 17 between the first liquid 3 and the second liquid 4 corresponds to a lens surface in the liquid lens device 100 (this lens surface will be hereinafter referred to as the lens surface 17). In this preferred embodiment, the refractive index of the second liquid 4 is larger than that of the first liquid 3. However, the refractive index of the first liquid 3 may be larger than that of the second liquid 4.

As shown in FIG. 1, the first liquid 3 and the second liquid 4 stored in the liquid chamber 1 are immiscible with each other, so that they are separated in two layers. In this preferred embodiment, the insulating layer 15 having water repellency is formed on the first transparent substrate 9. Accordingly, the first liquid 3 is repelled by the insulating layer 15 to gather adjacent to the second transparent substrate 10. On the other hand, the second liquid 4 wets the surface of the insulating layer 15.

The liquid lens device 100 further includes a fixing member 19 for fixing the first transparent substrate 9 and the second transparent substrate 10 to each other. The fixing member 19 is a boxlike member capable of accommodating the body 2 to thereby fix the first transparent substrate 9 and the second transparent substrate 10 to each other. More specifically, the fixing member 19 has a first abutting surface 19a abutting against the first transparent substrate 9 and a second abutting surface 19b abutting against the second transparent substrate 10. The first abutting surface 19a is formed with a light transmitting hole 19c corresponding to the light transmitting area A of the first transparent substrate 9, and the second abutting surface 19b is formed with a light transmitting hole 19d corresponding to the light transmitting area A of the second transparent substrate 10.

[Operation of Liquid Lens Device]

The operation of the liquid lens device 100 will now be described. As described above, the lens surface 17 is formed by the first liquid 3 and the second liquid 4 in the liquid chamber 1. In this preferred embodiment, the lens surface 17 is formed by the first liquid 3 having a convex surface and the second liquid 4 having a concave surface. Further, in this preferred embodiment, light enters the liquid lens device 100 from the second transparent substrate 10 and emerges from the first transparent substrate 9. Since the refractive index of the second liquid 4 is larger than that of the first liquid 3 in this preferred embodiment, the light entered from the second transparent substrate 10 diverges on the lens surface 17 and next emerges from the first transparent substrate 9.

The degree of divergence of light emerging from the first transparent substrate 9, i.e., the focal length of light passing through the lens surface 17 is determined by the curvature of the lens surface 17. In the case that no voltage is applied to the conductor layer 14 and the electrode 18 connected to the power circuit, the curvature of the lens surface 17 is determined by the physical properties of the first liquid 3, the second liquid 4, and the insulating layer 15 and the shape and size of the through hole 5 of the base substrate 6, for example.

Figure 2:
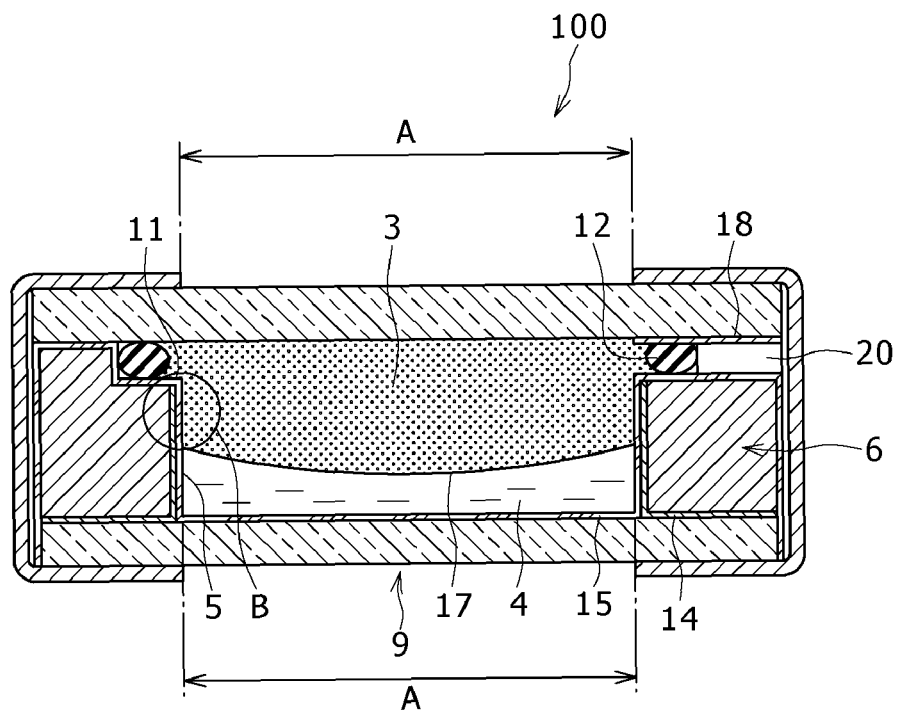
FIG. 2 is a schematic sectional view of the liquid lens device in the case that a voltage is applied to a conductor layer and an electrode.

FIG. 2 is a schematic sectional view of the liquid lens device 100 in the case that a voltage is applied to the conductor layer 14 and the electrode 18. When a predetermined voltage is applied to the conductor layer 14 and the electrode 18, electric charge is accumulated in the conductor layer 14 and the first liquid 3 opposed to each other with the insulating layer 15 interposed therebetween. The electric charge in the conductor layer 14 attracts the electric charge in the first liquid 3 to result in wetting of the surface of the insulating layer 15 with the first liquid 3 (electrowetting phenomenon). In this preferred embodiment, the surface of the insulating layer 15 is wetted with the first liquid 3 at an end portion of the through hole 5 near the surface 11 of the base substrate 6 (an encircled portion B shown in FIG. 2). As a result, the second liquid 4 is pushed by the first liquid 3 to gather at a central portion of the liquid chamber 1. Accordingly, the curvature of the lens surface 17 is decreased as shown in FIG. 2, so that the degree of divergence of light emerging from the first transparent substrate 9 is also decreased. In other words, the focal length of light passing through the lens surface 17 is increased. The voltage to be applied to the conductor layer 14 and the electrode 18 may be direct-current voltage or alternating-current voltage.

The curvature of the lens surface 17 changes according to the voltage applied to the conductor layer 14 and the electrode 18. When the curvature of the lens surface 17 changes, the focal length of light passing through the lens surface 17 also changes. Accordingly, the liquid lens device 100 according to this preferred embodiment can be used as a variable focus lens device.

[Manufacturing Method for Liquid Lens Device]

A manufacturing method for the liquid lens device 100 will now be described.

[Assembling Step for the First Transparent Substrate]

Figure 3A:
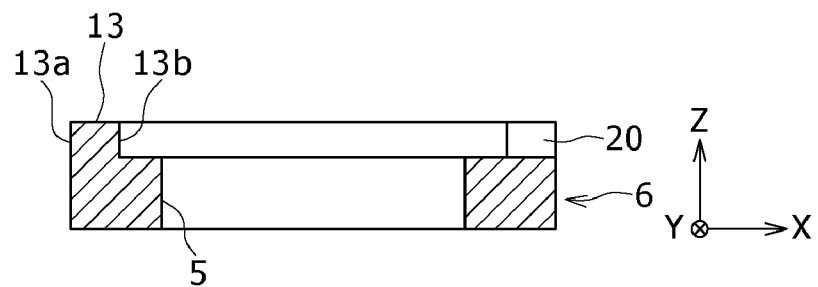
FIGS. 3A to 3D are sectional views for illustrating an assembling step for a first transparent substrate in the manufacturing method according to the first preferred embodiment.
Figure 3B:
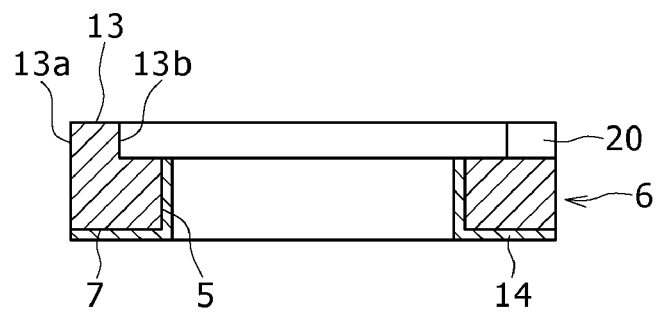
Figure 3C:
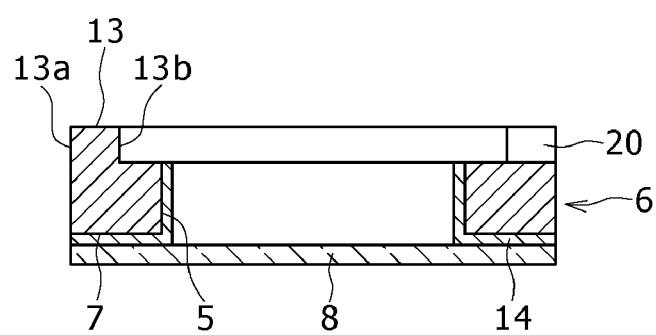
Figure 3D:
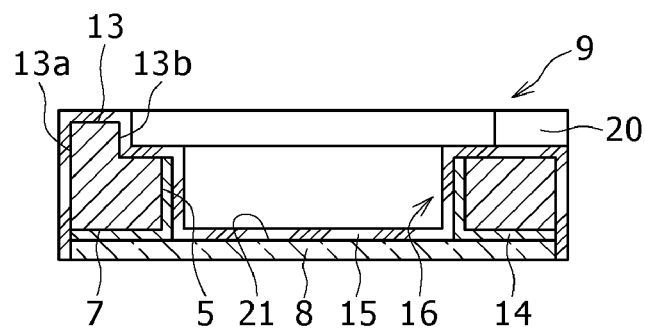
Figure 4:
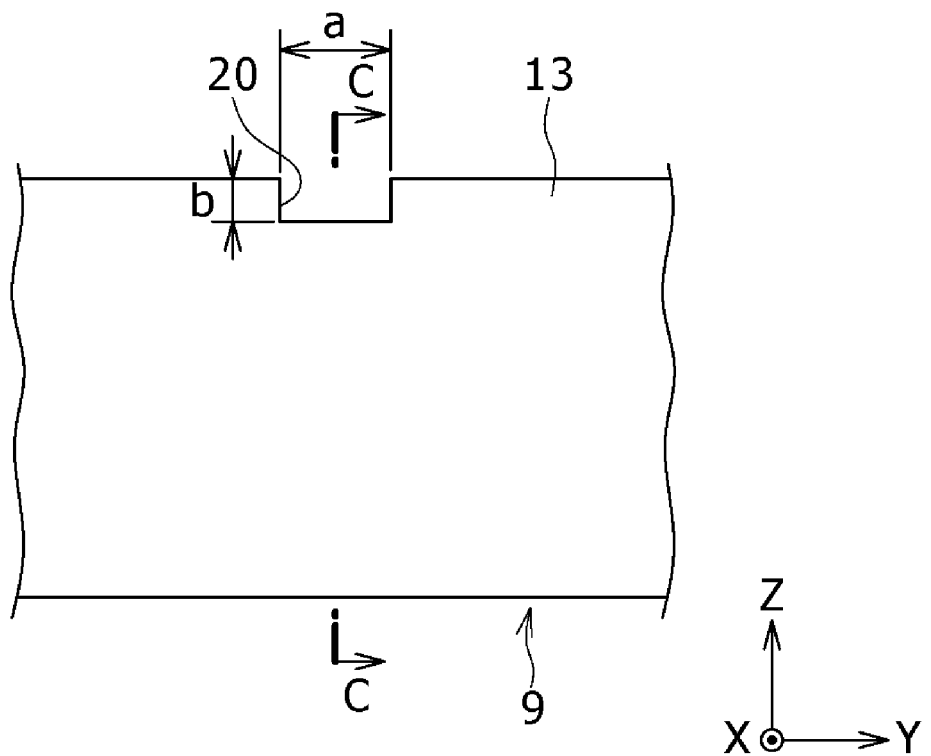
FIG. 4 is a side view of the first transparent substrate at a position where a recess is formed.

FIGS. 3A to 3D are sectional views for illustrating an assembling step for the first transparent substrate 9. FIG. 4 is a side view of the first transparent substrate 9 at a position where the recess 20 is formed (side view taken in the direction X in FIG. 3D). That is, FIG. 3D is a cross section taken along the line C-C in FIG. 4.

As shown in FIG. 3A, the through hole 5 is formed through the base substrate 6. For example, the through hole 5 is formed by molding such as injection molding. The inner surface of the base substrate 6 forming the through hole 5 may be tapered or curved as viewed in vertical section. Examples of the shape of the through hole 5 as viewed in plan (as viewed in the Z direction shown in FIG. 3A) include oval, circular, elliptical, and rectangular shapes.

In the step shown in FIG. 3A, the guide portion 13 is also formed on the base substrate 6. The guide portion 13 is formed along the outer circumference of the base substrate 6. The recess 20 is formed in the guide portion 13 so as to make the communication between the outer circumference 13a and the inner circumference 13b of the guide portion 13. The guide portion 13 and the recess 20 may be formed simultaneously with or separately from the formation of the through hole 5.

The base substrate 6 is formed of synthetic resin, metal, glass, or ceramic, for example.

As shown in FIG. 3B, the conductor layer 14 is continuously formed on the inner surface of the base substrate 6 forming the through hole 5 and on the lower surface 7 of the base substrate 6. The conductor layer 14 is a transparent thin film of tin oxide or ITO (Indium Tin Oxide), for example, formed by sputtering or plating, for example. The conductor layer 14 may be a thin film formed of a material having high reflectance, such as aluminum, silver, or alloy thereof. In this case, the conductor layer 14 is used as a reflecting surface, so that light entered the through hole 5 can be efficiently emerged from the first transparent substrate 9. As demanded, the conductor layer 14 may be patterned and formed on the inner surface of the base substrate 6 forming the through hole 5 and the lower surface 7 of the base substrate 6.

As shown in FIG. 3C, the light transmitting substrate 8 is bonded to the lower surface 7 of the base substrate 6 on which the conductor layer 14 is formed. The base substrate 6 and the light transmitting substrate 8 are bonded to each other by any method such as adhesion, ultrasonic welding, diffusion bonding, swaging, bolting, or anodic bonding. The light transmitting substrate 8 is formed of a material having high transparency, such as glass and acrylic resin.

As shown in FIG. 3D, the insulating layer 15 is formed so as to cover the conductor layer 14 formed on the inner surface of the base substrate 6 forming the through hole 5. The insulating layer 15 is a thin film having water repellency of parylene (p-xylylene resin) or inorganic material, for example, formed by various coating methods such as CVD (Chemical Vapor Deposition). In this preferred embodiment, the insulating layer 15 is also formed on the upper surface 21 of the light transmitting substrate 8 in its non-bonded area to the base substrate 6 and on the whole surface of the guide portion 13 in a continuous manner to the inner surface of the base substrate 6 forming the through hole 5. However, the area for forming the insulating layer 15 is not limited to the above-mentioned area, but any area may be adopted provided that the insulating layer 15 can cover the conductor layer 14. For example, the insulating layer 15 may be discontinuously formed in a predetermined area on the surface 21 of the light transmitting substrate 8. Thus, the electrode layer 16 having a laminated structure composed of the conductor layer 14 and the insulating layer 15 is formed on the inner surface of the base substrate 6 forming the through hole 5 as shown in FIG. 3D.

The recess 20 of the first transparent substrate 9 is covered with the insulating layer 15. Typically, the recess 20 has such a size that the dimensions a and b shown in FIG. 4 are 1 mm and 0.2 mm, respectively. However, the dimensions of the recess 20 are not limited to these values, but they may be suitably set.

[Assembling Step for the Body]

Figure 5A:
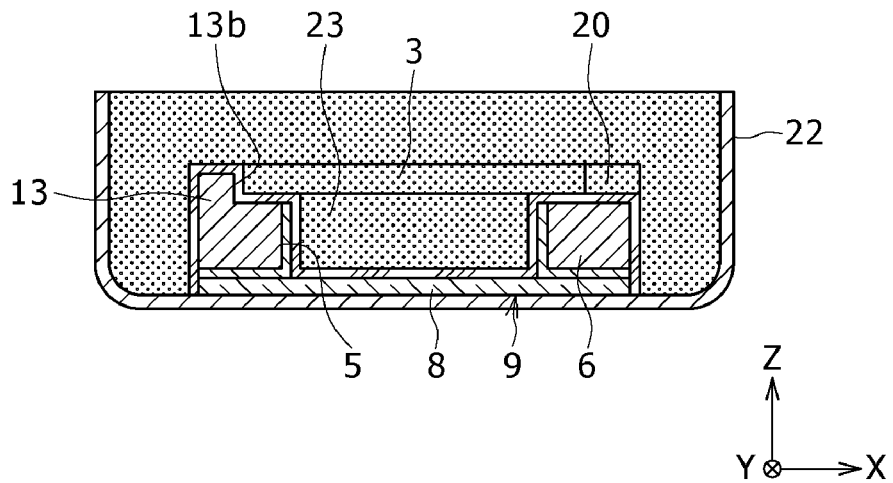
FIGS. 5A to 5C are sectional views for illustrating an assembling step for a body in the manufacturing method according to the first preferred embodiment.
Figure 5B:
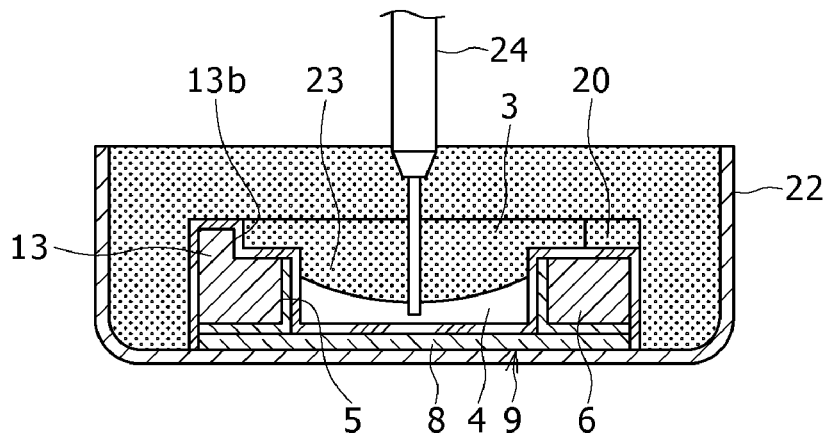
Figure 5C:
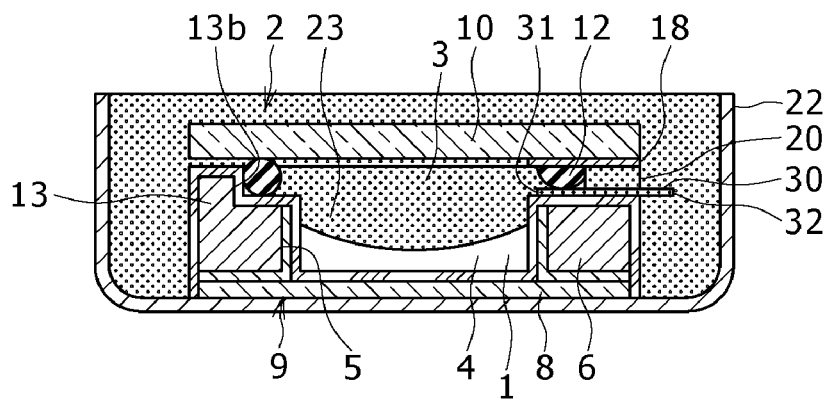

FIGS. 5A to 5C are sectional views for illustrating an assembling step for the body 2. As shown in FIG. 5A, the first transparent substrate 9 is immersed in a tank 22 containing the first liquid 3, thereby charging the first liquid 3 into a space 23 formed by the through hole 5 and the inside of the inner circumference 13b of the guide portion 13. As a modification, a syringe or the like may be used to charge the first liquid 3 into the space 23.

The amount of the first liquid 3 to be charged into the space 23 is not especially limited provided that it is larger than the amount of the first liquid 3 to be stored in the liquid chamber 1 of the liquid lens device 100 to be finally obtained. For example, in the case that the first liquid 3 is charged in such an amount that the space 23 is sufficiently filled with the first liquid 3 as in this preferred embodiment, it is possible to prevent the production of air bubbles in the liquid chamber 1 to be formed later.

The first liquid 3 is a conductive or polar liquid such as water, electrolyte solution (aqueous solution of electrolyte such as potassium chloride, sodium chloride, or lithium chlorode), alcohol having a low molecular weight (e.g., methyl alcohol or ethyl alcohol), and cold molten salt (ionic liquid).

As shown in FIG. 5B, the second liquid 4 is charged into the space 23. In this preferred embodiment, a syringe 24 is used to charge the second liquid 4 into the space 23 in its area adjacent to the light transmitting substrate 8 of the first transparent substrate 9. The insulating layer 15 formed on the first transparent substrate 9 has water repellency, so that the second liquid 4 wets the surface of the insulating layer 15 so as to push up the first liquid 3.

The second liquid 4 is a transparent insulating liquid. For example, a nonpolar solvent of hydrocarbon material such as decane, dodecane, hexadecane, or undecane may be used as the second liquid 4. Further, a nonpolar solvent of hydrophobic material such as silicone oil or fluorine material may be also used as the second liquid 4.

As shown in FIG. 5C, a hollow liquid discharge pin 30 is mounted in the recess 20 of the guide portion 13. Further, the annular sealing member 12 is mounted on the inner circumference 13b of the guide portion 13 in such a manner that the liquid discharge pin 30 is sandwiched between the sealing member 12 and the first transparent substrate 9. Further, the second transparent substrate 10 having the conductor layer 18 is placed on the sealing member 12 to close the space 23. Thus, the space 23 closed above is defined as the liquid chamber 1, and the body 2 having the liquid chamber 1 is prepared as shown in FIG. 5C.

The sealing member 12 is formed of elastomer or synthetic resin, for example. The second transparent substrate 10 is formed of a material having high transparency, such as glass and acrylic resin. The conductor layer 18 is a transparent thin film of tin oxide or ITO, for example, formed by sputtering or plating, for example.

The hollow liquid discharge pin 30 has a first end 31 and a second end 32. The first end 31 is located inside of the liquid chamber 1, so that the first end 31 is in contact with the first liquid 3 stored in the liquid chamber 1. The second end 32 is located outside of the liquid chamber 1. Both of the first end 31 and the second end 32 are open, so that the inside and the outside of the liquid chamber 1 are in communication with each other through the hollow liquid discharge pin 30. The liquid discharge pin 30 is formed of metal or plastic, for example. Typically, the inner diameter of the liquid discharge pin 30 is set to 0.2 to 0.3 mm. However, it may be suitably set.

Figure 6:
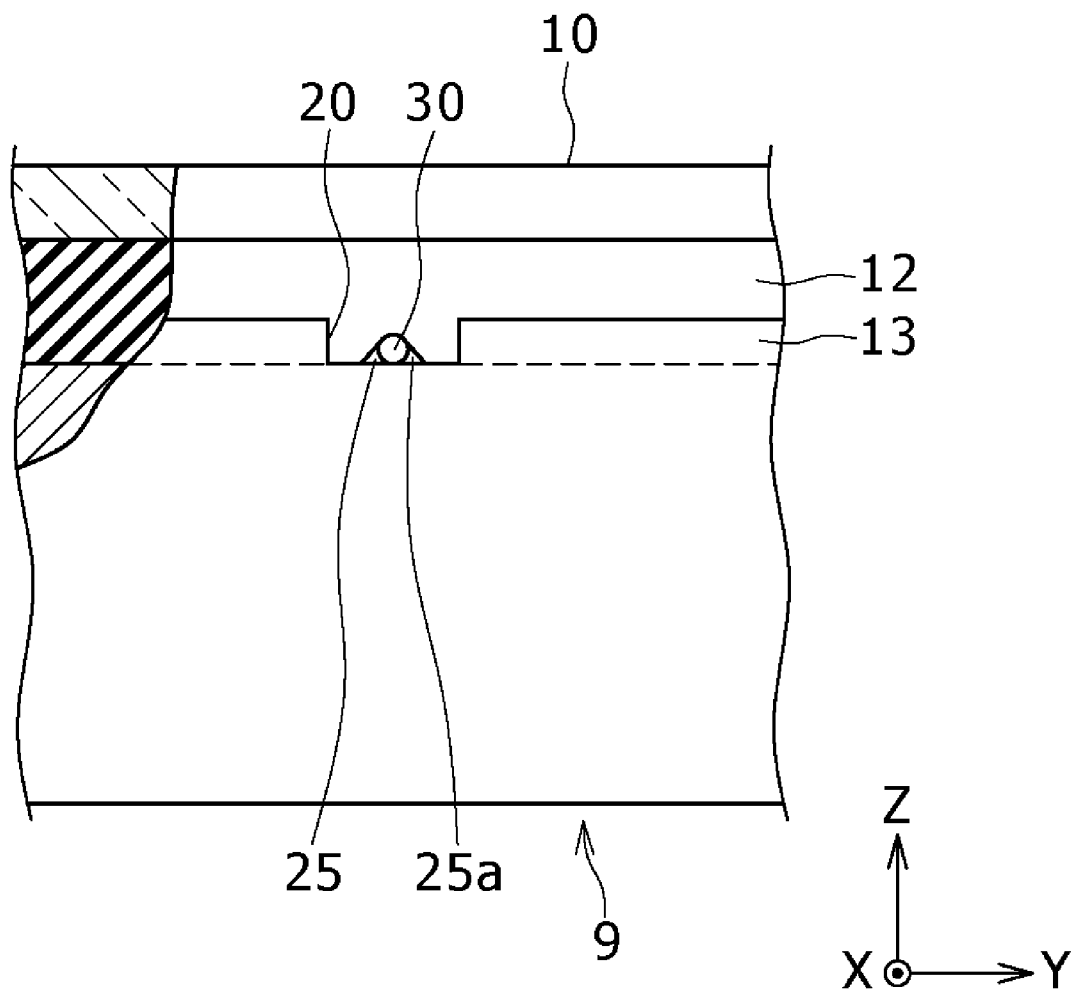
FIG. 6 is a partially cutaway, side view of the body at a position where a liquid discharge pin is mounted in the step shown in FIG. 5C.

FIG. 6 is a partially cutaway, side view of the body 2 at a position where the liquid discharge pin 30 is mounted in the step shown in FIG. 5C (side view taken in the direction X in FIG. 5C). In FIG. 6, the tank 22 is omitted.

As shown in FIG. 6, the liquid discharge pin 30 mounted in the recess 20 is sandwiched between the first transparent substrate 9 and the sealing member 12. Accordingly, the contact between the sealing member 12 and the first transparent substrate 9 in the recess 20 is partially hindered by the liquid discharge pin 30. Such a noncontact area formed between the sealing member 12 and the first transparent substrate 9 constitutes a liquid discharge passage 25 for making the communication between the inside and the outside of the liquid chamber 1. Accordingly, the inside of the liquid discharge pin 30 extending through the liquid discharge passage 25 also constitutes a part of the liquid discharge passage 25.

In the noncontact area where the liquid discharge passage 25 is formed, the sealing member 12 is elastically deformed by the liquid discharge pin 30, and a peripheral space 25a is formed about the liquid discharge pin 30 in the liquid discharge passage 25. In a sealing step to be described later, the peripheral space 25a may be filled with the sealing member 12. In this case, the peripheral space 25a can be sealed by the sealing member 12, and the liquid discharge passage 25 can be formed by only the inside of the liquid discharge pin 30. As a modification, the outer diameter of the liquid discharge pin 30, the modulus of elasticity of the sealing member 12, etc. may be suitably set so that the liquid discharge passage 25 is formed by only the inside of the liquid discharge pin 30.

[Sealing Step for the Liquid Chamber]

Figure 7A:
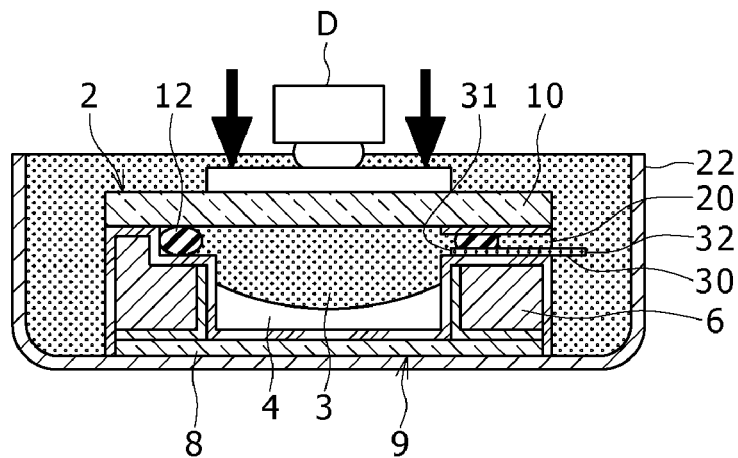
FIGS. 7A to 7C are sectional views for illustrating a sealing step for a liquid chamber in the manufacturing method according to the first preferred embodiment.
Figure 7B:
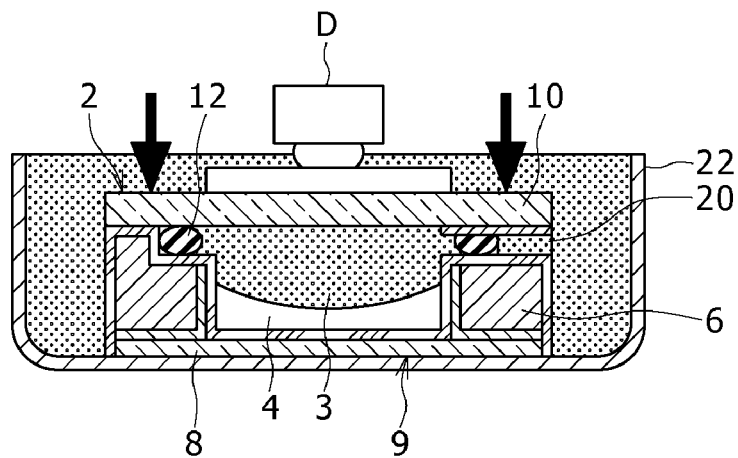
Figure 7C:
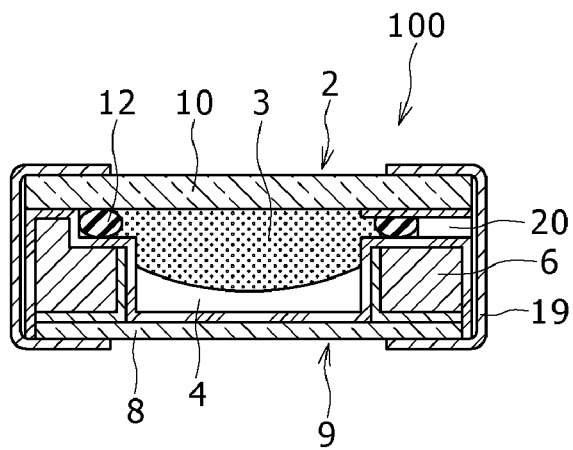

FIGS. 7A to 7C are sectional views for illustrating a sealing step for the liquid chamber 1 of the body 2 prepared by the steps shown in FIGS. 5A to 5C. As shown in FIG. 7A, a pressure applying mechanism D is used to apply pressure to the body 2 in such a direction that the second transparent substrate 10 is moved toward the first transparent substrate 9, thereby compressing the sealing member 12 sandwiched between the first transparent substrate 9 and the second transparent substrate 10. As a result, the volume of the liquid chamber 1 is reduced and the first liquid 3 kept in contact with the first end 31 of the liquid discharge pin 30 is discharged from the second end 32. At this time, there is a possibility that the first liquid 3 may be also discharged from the peripheral space 25a about the liquid discharge pin 30. However, the discharge of the first liquid 3 from the peripheral space 25a is not essential.

Accordingly, a rise in pressure in the liquid chamber 1 can be suppressed in compressing the sealing member 12 by the use of the pressure applying mechanism D. That is, even when the sealing member 12 is sufficiently compressed, an excess rise in pressure in the liquid chamber 1 can be prevented to thereby prevent damage to the liquid chamber 1. Accordingly, the sealed condition of the liquid chamber 1 can be improved. Further, both in sufficiently compressing the sealing member 12 and in suppressing a rise in pressure in the liquid chamber 1, no skill is demanded for the sealing operation for the liquid chamber 1 and no high-precision press is also demanded. Thus, the workability in sealing the liquid chamber 1 can be improved.

As shown in FIG. 7B, the liquid discharge pin 30 is removed from the recess 20. As a result, the sealing member 12 compressed by the liquid discharge pin 30 is elastically restored to close the liquid discharge passage 25. Accordingly, the recess 20 and the liquid chamber 1 are isolated from each other by the sealing member 12, thus sealing the liquid chamber 1.

In the case that the elastic restoration of the sealing member 12 is insufficient, the sealed condition of the liquid chamber 1 is also insufficient. For example, there is a case that the amount of compression of the sealing member 12 by the liquid discharge pin 30 is excessive and the sealing member 12 is therefore deformed beyond its elastic limit, so that after the liquid discharge pin 30 is removed, the sealing member 12 is not sufficiently elastically restored. However, in this preferred embodiment, the liquid discharge pin 30 is mounted in the recess 20, so that the amount of local compression of the sealing member 12 by the liquid discharge pin 30 can be reduced, thereby preventing degradation and fracture of the sealing member 12. As a modification, the guide portion 13 may be formed with a through hole in place of the recess 20, and the liquid discharge pin 30 may be inserted through this through hole. Also in this case, the amount of compression of the sealing member 12 can be reduced by suitably setting the position of the through hole to be formed in the guide portion 13.

Since the liquid discharge pin 30 is hollow, the first liquid 3 is discharged through the inside of the liquid discharge pin 30. Thus, the liquid discharge pin 30 opens the liquid discharge passage 25, and serves as a part of the liquid discharge passage 25 to contribute to the discharge of the first liquid 3.

As shown in FIG. 7C, the body 2 is taken out of the tank 22, and the fixing member 19 is next mounted to the body 2. The fixing member 19 is formed of metal or synthetic resin, for example. In this manner, the liquid lens device 100 is manufactured.

Various modifications of the steps shown in FIGS. 7A to 7C may be made in the following manner.

For example, in the step shown in FIG. 7B, the sealing member 12 may be further compressed after removing the liquid discharge pin 30 from the recess 20. For example, the liquid discharge pin 30 is removed from the recess 20 during compressing the sealing member 12 by a predetermined amount with the pressure applying mechanism D. When the liquid discharge pin 30 is removed during the compression of the sealing member 12, the pressure is kept applied to the sealed liquid chamber 1 to cause a rise in pressure in the liquid chamber 1. Accordingly, by suitably setting the timing of removal of the liquid discharge pin 30, the pressure in the liquid chamber 1 can be adjusted.

As described above, even when the sealing member 12 is further compressed to adjust the pressure in the liquid chamber 1 after removing the liquid discharge pin 30 to close the liquid discharge passage 25, the first liquid 3 is discharged before the closing step, thereby suppressing an excess rise in pressure in the liquid chamber 1 to reduce the possibility of damage to the liquid chamber 1.

In mounting the fixing member 19 to the body 2 in the step shown in FIG. 7C, the pressure in the liquid chamber 1 may be adjusted. As a method of adjusting the pressure in the liquid chamber 1, the following method may be adopted. In the steps shown in FIGS. 7A and 7B, the pressure to be applied by the pressure applying mechanism D, the stroke of the pressure applying mechanism D, or the timing of removal of the liquid discharge pin 30 is specified. In the case that the steps shown in FIGS. 7A and 7B are performed without the tank 22, the amount of the first liquid 3 to be discharged from the second end 32 of the liquid discharge pin 30 may be specified. After performing the steps shown in FIGS. 7A and 7B under the above-specified condition, the sealing member 12 is further compressed and the fixing member 19 is mounted to the body 2. In further compressing the sealing member 12, the pressure to be applied to the liquid chamber 1 is specified. By performing the steps shown in FIGS. 7A to 7C to seal the liquid chamber 1, the pressure in the liquid chamber 1 can be adjusted to a predetermined pressure. However, the parameter to be specified in obtaining a predetermined pressure in the liquid chamber 1 is not limited to the above.

In this preferred embodiment, the fixing member 19 is a boxlike member adapted to accommodate the body 2, thereby fixing the first transparent substrate 9 and the second transparent substrate 10 to each other. As a modification, the fixing member 19 may be composed of a first member, a second member, and a connecting member for connecting the first member and the second member. The first transparent substrate 9 and the second transparent substrate 10 are pressed by the first member and the second member, respectively, in such a direction as to compress the sealing member 12. The first member and the second member are fixed through the connecting member, thereby fixing the first and second transparent substrates 9 and 10 to each other.

Further, the fixing member 19 may be mounted to the body 2 by tightening screws or the like. In tightening the screws after temporarily setting the fixing member 19, the sealing member 12 may be further compressed.

In this manner, the sealing member 12 may be further compressed by the first and second transparent substrates 9 and 10 in fixing the first and second transparent substrates 9 and 10 by using the fixing member 19. Further, in adjusting the pressure in the liquid chamber 1, the sealing member 12 may be further compressed by the fixing member 19 mounted to the first and second transparent substrates 9 and 10. Thereafter, the first and second transparent substrates 9 and 10 may be fixed. Thus, the first and second transparent substrates 9 and 10 are fixed by the fixing member 19 to thereby ensure the sealed condition of the liquid chamber 1.

Second Preferred Embodiment

A manufacturing method for a liquid lens device according to a second preferred embodiment of the present invention will now be described with reference to FIGS. 8A and 8B. The description of parts similar to those of the first preferred embodiment will be omitted or simplified hereinafter.

Figure 8A:
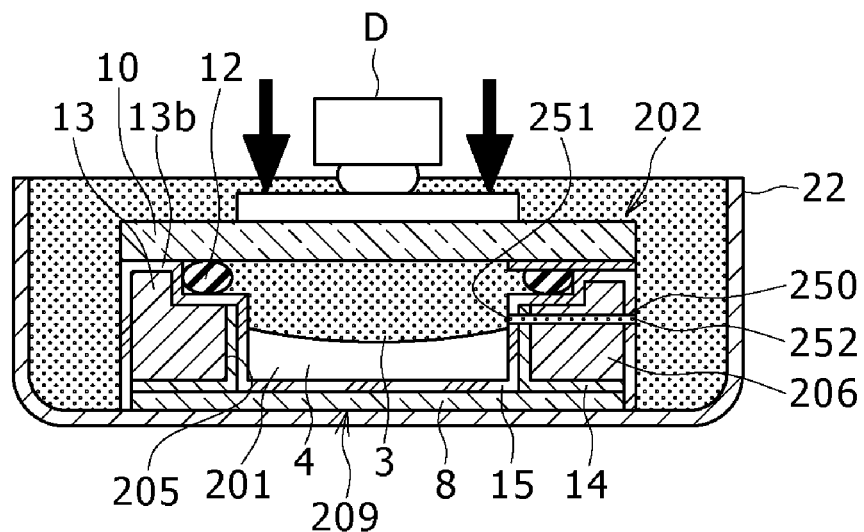
FIGS. 8A and 8B are sectional views for illustrating a sealing step for a liquid chamber in a manufacturing method according to a second preferred embodiment of the present invention.

As shown in FIG. 8A, a base substrate 206 is used. The base substrate 206 is formed with a through hole 205 similar to the through hole 5. The base substrate 206 is further formed with a through hole 250 extending between the inside and the outside of the through hole 205. The through hole 250 corresponds to the liquid discharge passage in the present invention, and it is hereinafter referred to as the liquid discharge passage 250. The liquid discharge passage 250 has a first end 251 opening to the inside of the through hole 205 and a second end 252 opening to the outside of the through hole 205. The liquid discharge passage 250 is formed at such a position that the first end 251 comes into contact with the first liquid 3 in the condition where a body 202 to be hereinafter described is prepared.

By a step similar to the assembling step for the first transparent substrate 9 in the first preferred embodiment, a conductor layer 14 is formed on the base substrate 206, and a light transmitting substrate 8 is next bonded to the base substrate 206. Thereafter, an insulating layer 15 is formed so as to cover the conductor layer 14, thus assembling a first transparent substrate 209. The conductor layer 14 and the insulating layer 15 are so formed as to open the first end 251 and the second end 252 of the liquid discharge passage 250.

The first transparent substrate 209 is immersed in the tank 22 containing the first liquid 3, thereby charging the first liquid 3 into the space 23 formed by the through hole 205 and the inside of the inner circumference 13b of the guide portion 13. Thereafter, the second liquid 4 is charged into the space 23. Thereafter, the sealing member 12 is mounted on the inner circumference 13b of the guide portion 13, and the second transparent substrate 10 is next placed on the sealing member 12 to close the space 23. Thus, the space 23 closed above is defined as a liquid chamber 201, and the body 202 having the liquid chamber 201 is prepared. In this condition, the first end 251 of the liquid discharge passage 250 is in contact with the first liquid 3.

Figure 8B:
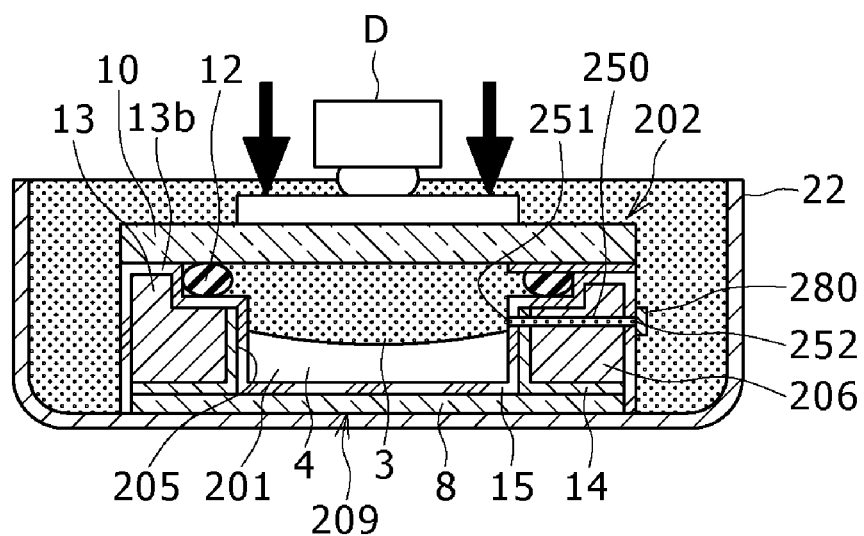

FIGS. 8A and 8B are sectional views for illustrating a sealing step for the liquid chamber 201 of the body 202 prepared above. As shown in FIG. 8A, a pressure applying mechanism D is used to apply pressure to the body 202 in such a direction that the second transparent substrate 10 is moved toward the first transparent substrate 209, thereby compressing the sealing member 12 sandwiched between the first transparent substrate 209 and the second transparent substrate 10. As a result, the first liquid 3 is discharged from the second end 252 of the liquid discharge passage 250.

As shown in FIG. 8B, a plug 280 formed of rubber or the like is fitted to the second end 252 of the liquid discharge passage 250 from the outside of the liquid chamber 201, thereby closing the second end 252 of the liquid discharge passage 250. Thus, the liquid chamber 201 is sealed. As a modification, the second end 252 may be filled with adhesive, resin, or metal, for example, thereby closing the second end 252. As another modification, the second end 252 may be fused by ultrasonic wave or heat, for example, thereby closing the second end 252. Any other methods capable of closing the second end 252 may be adopted. Any object for filling the second end 252 or a section configured to fuse the second end 252 corresponds to the closing section in the present embodiment.

Thereafter, a fixing member is mounted to the body 202 having the sealed liquid chamber 201, thus finishing the manufacturing method for the liquid lens device according to the second preferred embodiment.

In this preferred embodiment, the base substrate 206 having the liquid discharge passage 250 is used. As a modification, the liquid discharge passage 250 may be formed through the second transparent substrate 10. The forming position of the liquid discharge passage 250 is not limited provided that the first liquid 3 can be discharged through the liquid discharge passage 250 to the outside of the liquid chamber 201. In this preferred embodiment, the through hole as the liquid discharge passage 250 can be formed according to the size, shape, etc. of the liquid chamber 201, so that the workability in sealing the liquid chamber 201 can be improved without hindering a reduction in size and thickness of the liquid lens device. Further, by bending the through hole as the liquid discharge passage 250, it can be formed at such a position that the operation of the liquid lens device is not hindered.

Third Preferred Embodiment

A manufacturing method for a liquid lens device according to a third preferred embodiment will now be described with reference to FIGS. 9A and 9B. In this preferred embodiment, an annular sealing member 312 with a liquid discharge pin 330 is placed on the first transparent substrate 9 used in the first preferred embodiment. The liquid discharge pin 330 serves as the liquid discharge passage in the present embodiment. The liquid discharge pin 330 is mounted to the sealing member 312 so as to extend therethrough. The liquid discharge pin 330 has a first end 331 located inside of the annular sealing member 312 and a second end 332 located outside of the annular sealing member 312. The sealing member 312 is mounted on the guide portion 13 so that the liquid discharge pin 330 extends through the recess 20. The second transparent substrate 10 is placed on the sealing member 312 to prepare a body 302 having a liquid chamber 301.

Since the liquid discharge pin 330 is mounted to the sealing member 312, the spacing between the liquid discharge pin 330 and the sealing member 312 can be sealed by an elastic force of the sealing member 312. Accordingly, any additional sealing member for ensuring the sealed condition of the liquid chamber 301 is not demanded at a portion for mounting the liquid discharge pin 330, so that a reduction in the workability in sealing the liquid chamber 301 can be prevented.

The liquid discharge pin 330 may be mounted to the sealing member 312 after placing the sealing member 312 on the guide portion 13. In this case, the guide portion 13 may be formed with a through hole for insertion of the liquid discharge pin 330 in place of the recess 20, wherein the liquid discharge pin 330 is inserted through the sealing member 312 and the through hole of the guide portion 13. However, it is preferable to securely mount the liquid discharge pin 330 to the sealing member 312 before placing the sealing member 312 on the first transparent substrate 9 as in this preferred embodiment, thereby improving the reliability of the sealing operation for the liquid chamber 301.

Figure 9A:
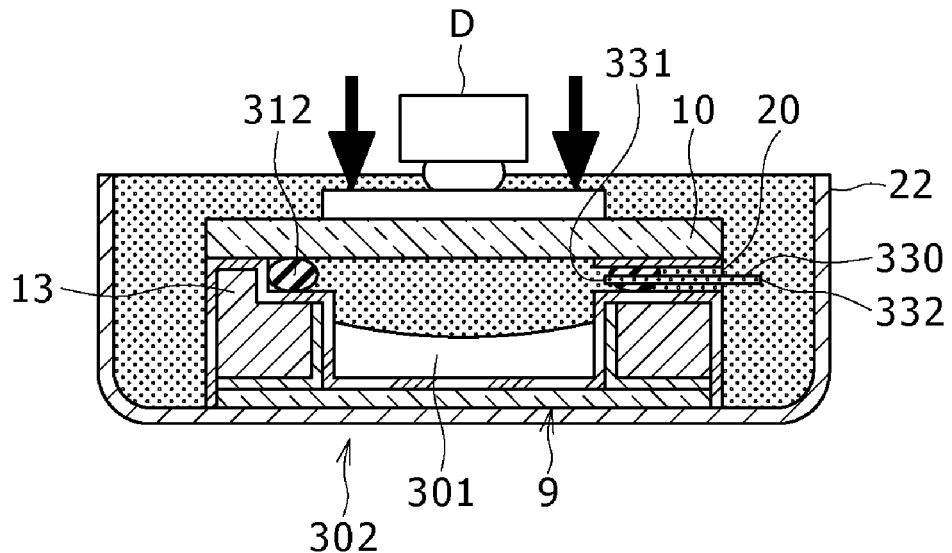
FIGS. 9A and 9B are sectional views for illustrating a sealing step for a liquid chamber in a manufacturing method according to a third preferred embodiment of the present invention.
Figure 9B:
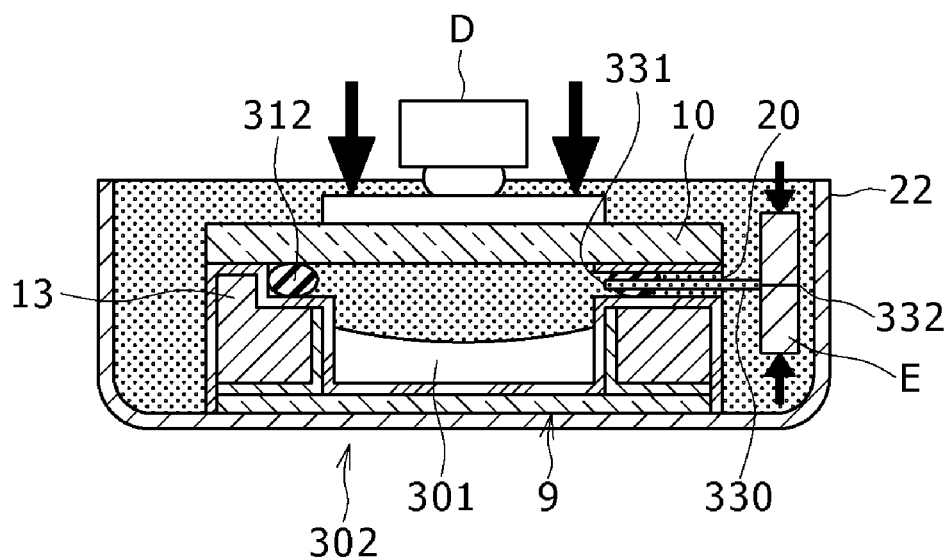

FIGS. 9A and 9B are sectional views for illustrating a sealing step for the liquid chamber 301 of the body 302 prepared above. As shown in FIG. 9A, a pressure applying mechanism D is used to apply pressure to the body 302 in such a direction that the second transparent substrate 10 is moved toward the first transparent substrate 9, thereby compressing the sealing member 312 sandwiched between the first transparent substrate 9 and the second transparent substrate 10. As a result, the first liquid 3 is discharged from the second end 332 of the liquid discharge pin 330.

As shown in FIG. 9B, a swaging mechanism E is used to close the second end 332 of the liquid discharge pin 330 by swaging. As a result, the liquid chamber 301 is sealed. The closing of the second end 332 of the liquid discharge pin 330 may be performed by laser welding or filling of an adhesive, for example. The closing of the second end 332 by swaging in this preferred embodiment is a simple operation, so that an increase in equipment cost can be suppressed.

Thereafter, a fixing member is mounted to the body 302 having the sealed liquid chamber 301 to finish the manufacturing method for the liquid lens device according to this preferred embodiment. To avoid the contact between the liquid discharge pin 330 mounted to the sealing member 312 and the fixing member, the fixing member may be formed with a recess or the like for insertion of the liquid discharge pin 330.

Modifications

The present application is not limited to the above preferred embodiments, but various modifications may be made without departing from the scope of the present invention.

Figure 10:
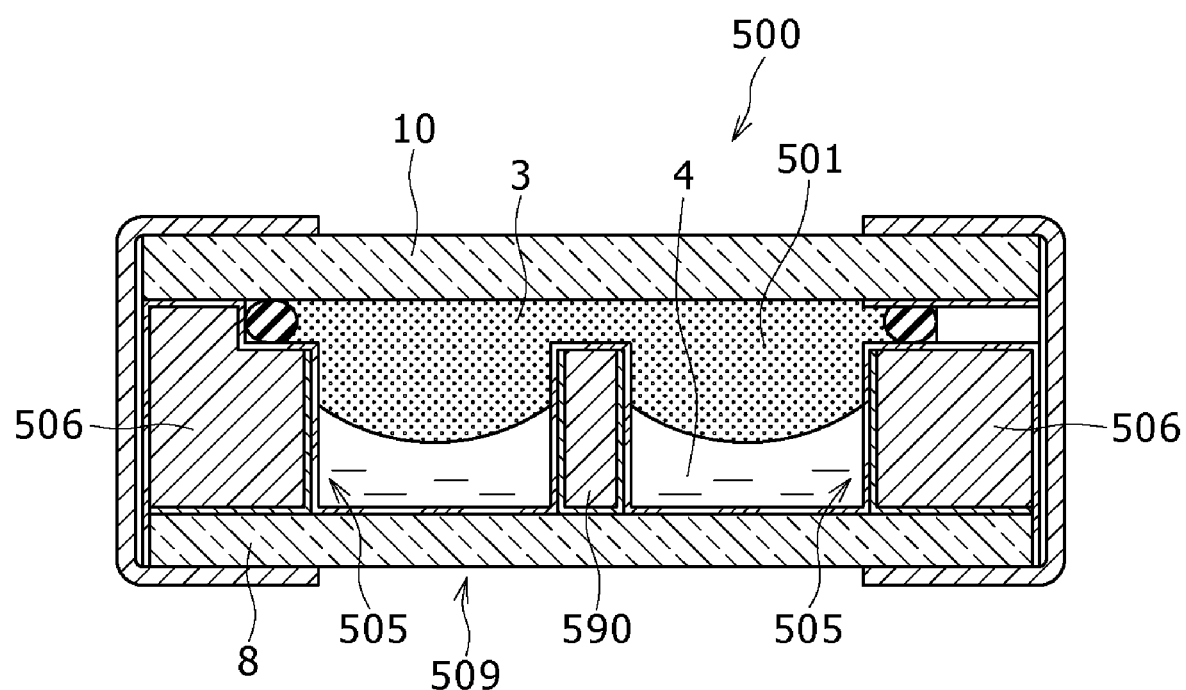
FIG. 10 is a sectional view of a liquid lens device manufactured by a manufacturing method according to a modification of the first preferred embodiment.

For example, FIG. 10 is a sectional view of a liquid lens device 500 manufactured by a manufacturing method according to a modification of the first preferred embodiment. The liquid lens device 500 includes a base substrate 506 having a plurality of through holes 505. The liquid lens device 500 is used as a lens array.

The plural through holes 505 are partitioned by a partition wall 590 in such a manner that the first liquid 3 stored in a liquid chamber 501 can flow between the plural through holes 505. Accordingly, a single liquid discharge passage may be formed in manufacturing the liquid lens device 500, thereby improving the workability in sealing the liquid chamber 501. Further, in the case of manufacturing a liquid lens device such that a first liquid stored in a liquid chamber cannot flow between a plurality of through holes partitioned by a partition wall, a plurality of liquid discharge passages respectively communicating with the plural through holes may be formed to thereby improve the workability in sealing the liquid chamber.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A manufacturing method for a liquid lens device comprising:
preparing a body having a liquid chamber, a conductive first liquid stored in said liquid chamber, an insulating second liquid stored in said liquid chamber, an electrode kept in contact with said first liquid, and a liquid discharge passage for making the communication between the inside and the outside of said liquid chamber, said liquid chamber being defined by a first transparent substrate on which an electrode layer is formed, a second transparent substrate opposed to said first transparent substrate, and an annular sealing member interposed between said first transparent substrate and said second transparent substrate, said first liquid and said second liquid having different refractive indices and being immiscible with each other;
applying pressure to said first and second transparent substrates to thereby compress said sealing member and discharge said first liquid through said liquid discharge passage to the outside of said liquid chamber; and
closing said liquid discharge passage; and
wherein preparing said body includes mounting a hollow liquid discharge pin for opening said liquid discharge passage between said first transparent substrate and said sealing member; and closing said liquid discharge passage includes removing said liquid discharge pin from said body to elastically restore said sealing member.

2. The manufacturing method for the liquid lens device according to claim 1, wherein said first transparent substrate has a guide portion formed on a surface opposed to said second transparent substrate so as to surround the outer circumference of said sealing member and a recess formed in said guide portion so as to extend between the outer circumference and the inner circumference of said guide portion; and preparing said body comprises mounting said liquid discharge pin in said recess.

3. The manufacturing method for the liquid lens device according to claim 1, wherein preparing said body has the step of forming a through hole as said liquid discharge passage in said body; and closing said liquid discharge passage includes plugging an outer end of said through hole located outside of said liquid chamber.

4. The manufacturing method for the liquid lens device according to claim 1, wherein preparing said body includes mounting a hollow liquid discharge pin as said liquid discharge passage to said sealing member; and closing said liquid discharge passage includes closing an outer end of said liquid discharge pin located outside of said liquid chamber.

5. The manufacturing method for the liquid lens device according to claim 4, wherein closing said liquid discharge passage comprises swaging said outer end of said liquid discharge pin.

6. The manufacturing method for the liquid lens device according to claim 1, further comprising further applying pressure to said first and second transparent substrates to thereby further compress said sealing member after performing said step of closing said liquid discharge passage.

7. The manufacturing method for the liquid lens device according to claim 6, wherein further applying pressure comprises fixing said first and second transparent substrates to each other by using a fixing member.

* * * * *